US011961349B1

(12) United States Patent
Else et al.

(10) Patent No.: US 11,961,349 B1
(45) Date of Patent: *Apr. 16, 2024

(54) BIOMETRIC AUTHENTICATION FOR SECURITY SENSOR BYPASS

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,266

(22) Filed: Aug. 18, 2023

Related U.S. Application Data

(63) Continuation of application No. 17/987,521, filed on Nov. 15, 2022, now Pat. No. 11,783,655.

(51) Int. Cl.
*G07C 9/22* (2020.01)
*E05B 17/10* (2006.01)
(Continued)

(52) U.S. Cl.
CPC ................ *G07C 9/21* (2020.01); *E05B 17/10* (2013.01); *G07C 9/00563* (2013.01);
(Continued)

(58) Field of Classification Search
CPC .. G07C 9/21; G07C 9/00571; G07C 9/00309; G07C 9/00817; G07C 9/20; G07C 2009/00769; G07C 2209/65; G07C 9/00174; G07C 9/00563; G07C 9/0069; G07C 9/00896; G07C 9/32; G07C 2009/00793; G07C 2209/04; G07C 2209/64; G07C 9/28; G08B 13/00; G08B 17/10; G08B 25/008; G08B 29/00; G08B 5/00; G08B 13/19602; G08B 13/19613; G08B 13/2402; G08B 13/2491; G08B 19/00; G08B 25/001; G08B 25/009; G08B 3/10; G05B 19/00; H04L 65/1069; H04L 12/1818; H04L 12/1822; H04L 12/1831;
(Continued)

(56) References Cited

U.S. PATENT DOCUMENTS 7,847,675 B1 * 12/2010 Thyen ................ G07C 9/00896 340/5.31
10,282,927 B1 * 5/2019 Hutz ........................ G07C 9/20
(Continued)

*Primary Examiner* — Dionne Pendleton
(74) *Attorney, Agent, or Firm* — WEISBERG I.P. LAW, P.A.

(57) ABSTRACT

A method implemented by a security sensor device is provided. The security sensor device receives a user input, performs a biometric authentication of a user associated with the user input, modifies a state of the security sensor device based at least in part on the biometric authentication and the user input, detects a sensor trigger when the security sensor device is in the modified state, determines a sensor indication based at least in part on the sensor trigger, the state of the security sensor device subsequent to being modified, and the user input, and transmits the sensor indication to a premises security control device. The sensor indication is configured to cause the premises security control device to perform at least one premises security action.

16 Claims, 3 Drawing Sheets

(51) Int. Cl.

| | |
|---|---|
| ***G07C 9/00*** | (2020.01) |
| ***G07C 9/21*** | (2020.01) |
| ***G08B 13/00*** | (2006.01) |
| ***G08B 17/10*** | (2006.01) |
| ***G08B 25/00*** | (2006.01) |

(52) U.S. Cl.
CPC ............. *G08B 13/00* (2013.01); *G08B 17/10* (2013.01); *G08B 25/008* (2013.01)

(58) Field of Classification Search
CPC ............. H04L 2463/082; H04L 63/083; H04L 65/1046; H04L 65/1093; H04L 65/4015; H04L 65/403; H04L 67/02; H04L 67/306; G01S 5/0284; G01S 5/14; G01S 3/00; G06T 2207/10016; G06T 2207/10048; G06T 2207/30196; G06T 2207/30232; G06T 7/246; G06T 7/00; G06V 20/52; G06V 40/172; H04M 15/56; H04M 15/8207; H04M 2203/6045; H04M 2215/78; H04M 7/0024; H04M 7/0078; H04N 23/51; H04N 23/56; H04N 23/60; H04N 23/661; H04N 23/90; H04N 1/00; H04Q 2209/40; H04Q 2209/43; H04Q 9/00
See application file for complete search history.

(56) References Cited

U.S. PATENT DOCUMENTS

| | | | | |
|---|---|---|---|---|
| 11,783,655 | B1 * | 10/2023 | Else ........................ | G08B 13/00 340/5.6 |
| 2008/0229792 | A1 * | 9/2008 | Maple ................... | G09F 3/0358 292/307 R |
| 2010/0201523 | A1 | 8/2010 | Tommaseo | |
| 2014/0292481 | A1 * | 10/2014 | Dumas ..................... | G07C 9/28 340/5.61 |
| 2018/0047278 | A1 | 2/2018 | Dey et al. | |
| 2018/0336747 | A1 * | 11/2018 | Schoenfelder ........... | G07C 9/32 |
| 2019/0244511 | A1 | 8/2019 | Krishnamoorthy et al. | |
| 2019/0391227 | A1 * | 12/2019 | Zhang ....................... | G01S 5/14 |
| 2020/0074837 | A1 | 3/2020 | Lamb et al. | |
| 2020/0118419 | A1 | 4/2020 | Lamb | |
| 2020/0312104 | A1 | 10/2020 | Seelman | |
| 2021/0287509 | A1 | 9/2021 | Shepard | |

* cited by examiner

BIOMETRIC AUTHENTICATION FOR SECURITY SENSOR BYPASS

CROSS-REFERENCE TO RELATED PATENT APPLICATION

This application is a continuation of and claims priority to U.S. Utility patent application Ser. No. 17/987,521, filed on Nov. 15, 2022, entitled BIOMETRIC AUTHENTICATION FOR SECURITY SENSOR BYPASS, the entirety of which is incorporated herein by reference.

TECHNICAL FIELD

The present technology is generally related to methods and premises security systems, and in particular, premises security systems including a security sensor device with biometric authentication for configuring bypass and/or un-bypass functionality.

BACKGROUND

In some existing premises security systems, security sensor devices are used to monitor one or more aspects of their environment and trigger alarms under certain conditions. For example, one type of sensor is a door/window sensor which detects when a door/window is opened. These may be installed, for example, on a liquor, gun or medicine cabinet door, where the sensor would be armed all the time except when the user need to access it. Another typical application for such sensors are for windows/doors which may be armed at certain times, e.g., when the premises security system is armed (for example, when a residential premises user is away from home), but is not armed at other times (e.g., when the user is at home).

Existing premises security systems may be configured to allow the user to bypass and/or un-bypass (e.g., temporarily disarm, disable, silence, etc.) a security sensor device. Existing systems, however, may require the user to manually configure such bypass and/or un-bypass functionality, e.g., by logging into a premises security system control device/panel, identifying the sensor of interest, and adjusting its settings, which may be a slow and inefficient process. Other existing systems may provide for a simple button on the security sensor device for activating a bypass/un-bypass functionality, but such sensors may be vulnerable to tampering or improper use, e.g., by an intruder.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
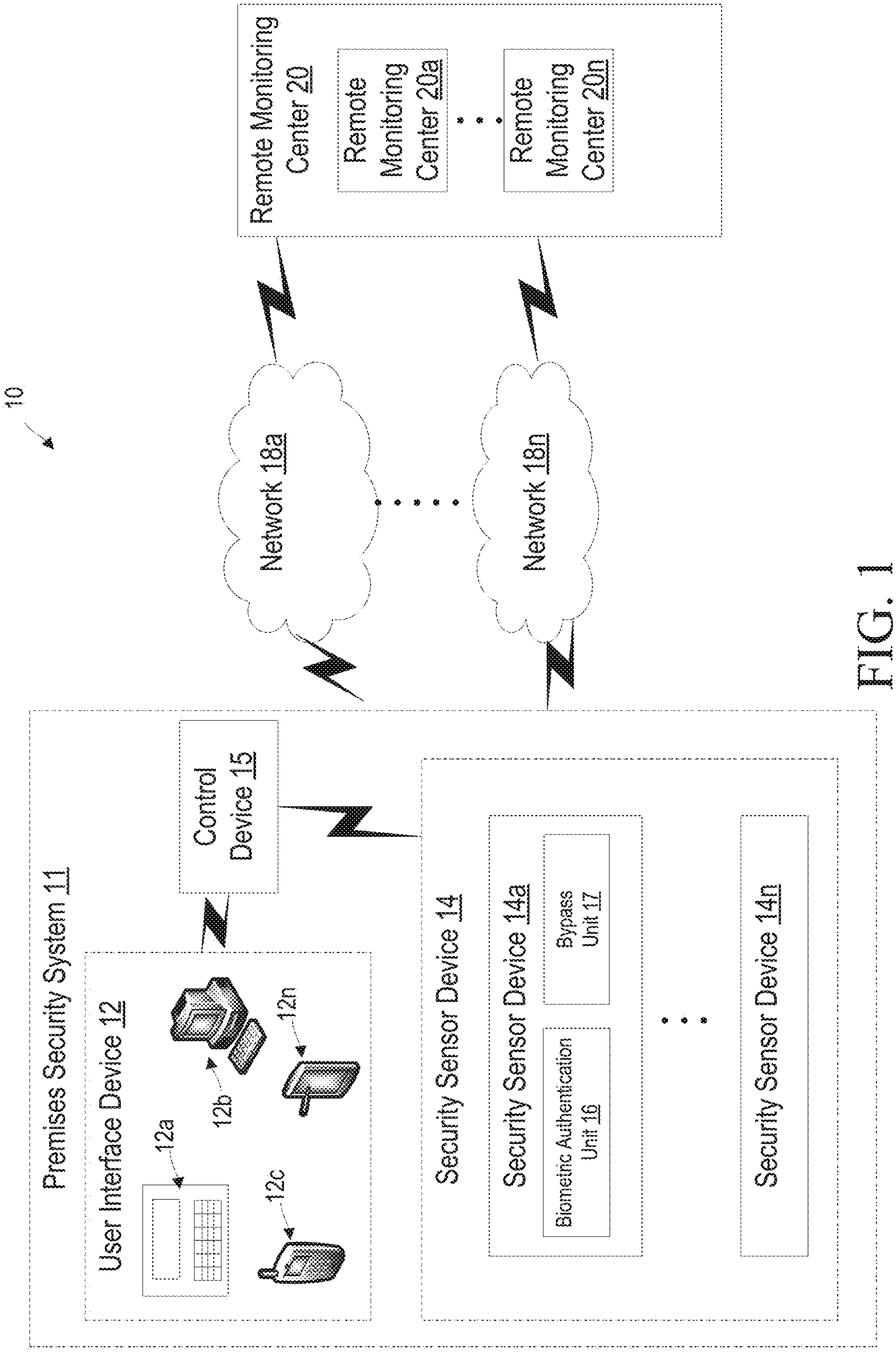
FIG. 1 is a diagram of an example system comprising a premises security system according to principles of the present disclosure.

Some embodiments advantageously provide a method, device, and system for biometric authentication for configuring security sensor bypass and/or un-bypass functionality, e.g., via fingerprint sensing and/or facial recognition hardware included in the security sensor.

Before describing in detail exemplary embodiments, it is noted that the embodiments may reside in combinations of apparatus components and processing steps related to biometric authentication for configuring security sensor bypass/un-bypass functionality. Accordingly, components may be represented where appropriate by conventional symbols in the drawings so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including," "has," and/or "having," when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements there is shown in FIG. 1 a system designated generally as "10." System 10 may include premises security system 11 where premises security system 11 includes and/or is associated with one or more user interface devices 12*a* to 12*n* (collectively referred to as "user interface device 12"), one or more premises security sensor devices 14*a* to 14*n* (collectively referred to as "security sensor device 14"), and control device 15.

Security sensor device 14 may be configured for sensing one or more aspects of the environment, e.g., an open or closed door, open or closed window, motion, heat, smoke, gas, sounds, images, etc., for determining a sensor indication or message based at least in part on the sensed environment, and for transmitting the indication/message to another entity in the premises security system, e.g., control device 15, other device(s) associated with premises security system 11, etc. Various types of security sensor devices 14 may be used, e.g., various safety related sensors such as motion sensors, infrared sensors, fire sensors, heat sensors, carbon monoxide sensors, flooding sensors and contact sensors, image sensors, sound sensors, etc., among other sensor types. Security sensor device 14 may include a biometric authentication unit 16 configured for authenticating a user input. Security sensor device 14 may include bypass unit 17 for determining or configuring a state of the sensor device and/or determining or configuring an indication or message for transmission to another entity, e.g., based at least in part on the sensor's environment and a biometric authentication performed at least partially at the security sensor device 14 (e.g., by biometric authentication unit 16), as described herein.

System 10 may further include one or more networks 18*a* to 18*n* (collectively referred to as "network 18"), and one or more remote monitoring centers 20*a* to 20*n* (collectively referred to as "remote monitoring center 20"), communicating with each other or with at least one other entity in system 10.

User interface device 12 may be a wireless device that allows a user to communicate with control device 15. User interface device 12 may be a portable control keypad/interface 12*a*, computer 12*b*, mobile phone 12*c* and tablet 12*n*, among other devices that allow a user to interface with control device 15 and/or one or more premises security sensor devices 14. User interface device 12 may communicate at least with control device 15 using one or more wired and/or wireless communication protocols. For example, portable control keypad 12*a* may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols, user interface device 12.

The security sensor devices 14 may communicate with control device 15 via proprietary wireless communication protocols and may also use Wi-Fi. Other communication technologies can also be used, and the use of Wi-Fi is merely an example.

Control device 15 may provide one or more of management functions, monitoring functions, analysis functions, control functions such as power management, premises device management and alarm management and/or analysis, among other functions to premises security system 11. In particular, control device 15 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises, such as lighting and thermostat functions.

Control device 15 may communicate with network 18 via one or more communication links. In particular, the communications links may be broadband communication links such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link. Network 18 may be a wide area network, local area network, wireless local network and metropolitan area network, among other networks. Network 18 provides communications among one or more of control device 15, remote monitoring center 20 and security sensor device 14.

Figure 2:
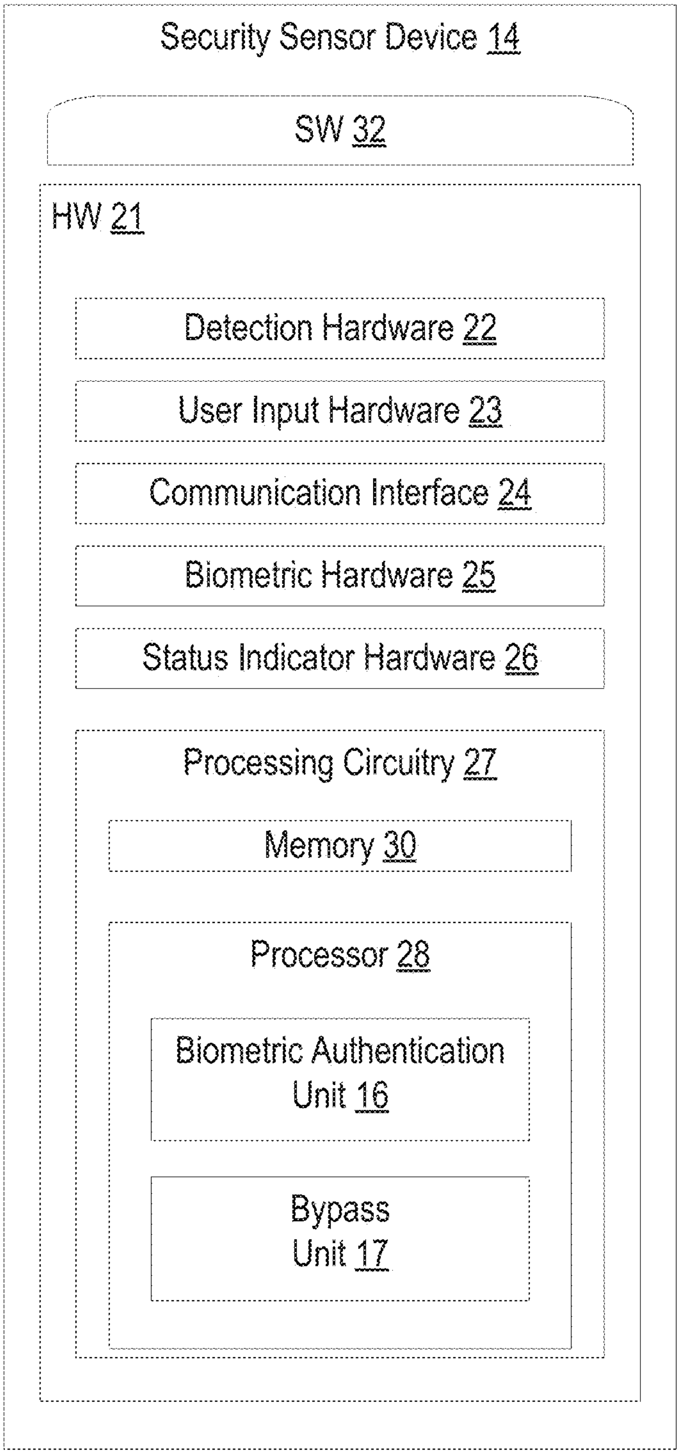
FIG. 2 is a block diagram of a security sensor device according to some embodiments of the present disclosure.

With respect to FIG. 2, the example system 10 includes a security sensor device 14 that includes hardware 21 enabling the security sensor device 14 to communicate with one or more entities in system 10 and to perform one or more functions described herein.

The hardware 21 may include detection hardware 22 for detecting one or more triggers, e.g., environmental triggers. Detection hardware 22 may include, for example, one or more motion sensors, proximity sensors, distance sensors, contact sensors, door sensors, window sensors, light sensors, glass break sensors, temperature sensors, image sensors, audio sensors, etc.

The hardware 21 may include user input hardware 23, which may include, for example, one or more of a physical button, a touch button, a touchless button, a switch, a knob, a dial, gesture detector, etc. In some embodiments, user input hardware 23 may include a voice input component, e.g., a component that uses voice recognition to receive spoken verbal commands from a user, such as "activate the sensor", "activate an alarm", "enter bypass mode", "exit bypass mode," etc.

The hardware 21 may include a communication interface 24 for setting up and maintaining at least a wired and/or wireless connection to one or more entities in system 10 such as remote monitoring center 20, another security sensor device 14, user interface device 12, control device 15, etc.

Security sensor device 14 may include biometric hardware 25, which may include, for example, one or more fingerprint sensors, hand geometry sensors, facial recognition sensors, retina/iris pattern sensors, voice recognition sensors, etc.

Security sensor device 14 may include status indicator hardware 26 which may include, for example, one or more light emitting devices, such as light emitting diodes (LEDs) of various colors e.g., a red light indicating the security sensor device 14 is in a non-bypass state, a green light indicating it is in a bypass state, a yellow light indicating it is in an override state, etc.), sound emitting devices, such as speakers, which emit sounds corresponding to a state of the device (e.g., a single chirp indicating the security sensor device 14 is in a non-bypass state, a double chirp indicating it is in a bypass state, etc.), and/or any other hardware for indicating a status of a device (e.g., a small screen which displays text and/or graphic icons, a haptic feedback generator which vibrates according to various patterns corresponding to different states, etc.).

In the embodiment shown, the hardware 21 of the security sensor device 14 further includes processing circuitry 27. The processing circuitry 27 may include a processor 28 and a memory 30. In particular, in addition to or instead of a processor, such as a central processing unit, and memory, the processing circuitry 27 may comprise integrated circuitry for processing and/or control, e.g., one or more processors and/or processor cores and/or Field Programmable Gate Arrays (FPGAs) and/or Application Specific Integrated Circuits (ASICs) adapted to execute instructions. The processor 28 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the security sensor device 14 further has software 32 stored internally in, for example, memory 30, or stored in external memory (e.g., database, storage array, network storage device, etc.) accessible by the security sensor device 14 via an external connection. The software 32 may be executable by the processing circuitry 27. The processing circuitry 27 may be configured to control any of the methods and/or processes described herein and/or to cause such methods, and/or processes to be performed, e.g., by security sensor device 14. Processor 28 corresponds to one or more processors 28 for performing security sensor device 14 functions described herein. The memory 30 is configured to store data, programmatic software code and/or other information described herein. In some embodiments, the software 32 may include instructions that, when executed by the processor 28 and/or processing circuitry 27, cause the processor 28 and/or processing circuitry 27 to perform the processes described herein with respect to security sensor device 14. For example, processing circuitry 27 of the security sensor device 14 may include biometric authentication unit 16, which is configured to perform one or functions described herein such as with respect to biometrically authenticating a user, e.g., based at least in part on captured biometric data received from biometric hardware 25, for example, by comparing the captured biometric data with authentic and/or reference biometric data stored in a database (e.g., stored in memory 30, in control device 15, in a remote server, etc.). Processing circuitry 27 of the security sensor device 14 may also include bypass unit 17, which is configured to perform one or more functions described herein, such as with respect to modifying a state of the security sensor device 14 (e.g., based at least in part on the result of the biometric authentication unit 16 comparing captured biometric data with authentic and/or reference biometric data), modifying the configuration of the security sensor device 14 to cause it to respond differently to one or more sensor stimuli, determining a security sensor indication/signal/message, causing transmission of the indication/signal/message to another premises security entity (e.g., control device 15), etc.

Although FIGS. 1 and 2 show biometric authentication unit 16 and bypass unit 17 as being within a respective processor, these units may be implemented such that a portion of the unit is stored in a corresponding memory within the processing circuitry. In other words, the units may be implemented in hardware or in a combination of hardware and software within the processing circuitry.

Figure 3:
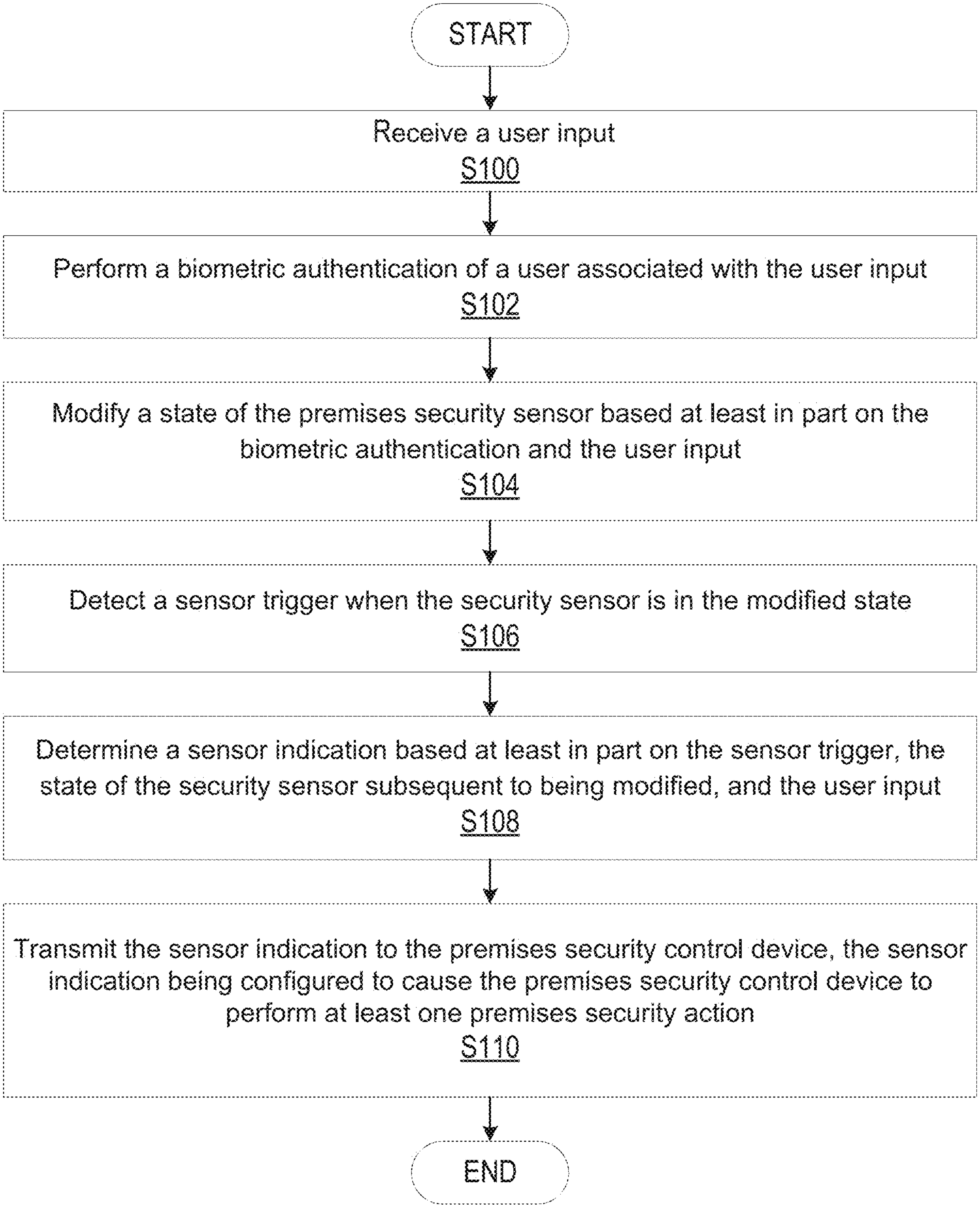
FIG. 3 is a flowchart of an example process implemented by a security sensor device according to some embodiments of the present disclosure.

FIG. 3 is a flowchart of an example process implemented by a security sensor device 14 according to one or more embodiments of the present disclosure. One or more blocks described herein may be performed by one or more elements of security sensor device 14 such as by one or more of detection hardware 22, user input hardware 23, communication interface 24, biometric hardware 25, processing circuitry 27 (including the biometric authentication unit 16, bypass unit 17), processor 28, memory 30, etc. Security sensor device 14 is configured to receive (Block S100) a user input, as described herein. Security sensor device 14 is configured to perform (Block S102) a biometric authentication of the user associated with the user input, as described herein. Security sensor device 14 is configured to modify (Block S104) a state of the security sensor device based at least in part on the biometric authentication and the user input, as described herein. Security sensor device 14 is configured to detect (Block S106) a sensor trigger when the security sensor device is in the modified state, as described herein. Security sensor device 14 is configured to determine (Block S108) a sensor indication based at least in part on the sensor trigger, the state of the security sensor subsequent to being modified, and the user input, as described herein. Security sensor device 14 is configured to transmit (Block S110) the sensor indication to the control device 15, where the sensor indication is configured to cause the control device 15 to perform at least one premises security action, as described herein.

According to one or more embodiments, the sensor trigger includes at least one of a door opening in proximity to the security sensor device 14, a window opening in proximity to the security sensor device 14, an adult moving in proximity to the security sensor device 14, a child moving in proximity to the security sensor device 14, an animal moving in proximity to the security sensor device 14, and/or a vehicle moving in proximity to the security sensor device 14.

According to one or more embodiments, modifying the state of the security sensor device 14 includes transitioning the security sensor device 14 to an override state based at least in part on the user input being associated with a first input pattern (e.g., a pattern of button presses, a gesture, a spoken command, etc.), where the override state is associated with a transmission of a false sensor indication that indicates a false sensor trigger. In some embodiments, the term "false" (e.g., as in a "false sensor indication" or "false sensor trigger") may refer to a sensor indication which indicates that a sensor trigger was detected by the security sensor device 14, even in the absence of that sensor trigger. For example, in an embodiment where the security sensor device 14 is configured to detect whether a window is open or closed, the security sensor device 14 in the override state may indicate that the window is open, even if the detection hardware 22 detects that the window is closed. The sensor indication indicating the false sensor trigger is configured to cause the premises security control device 15 to perform at least one premises security action, for example, triggering an audible alarm of the premises security system 11 associated with the false sensor trigger, triggering a silent alarm of the premises security system 11 associated with the false sensor trigger, or triggering an expedited alarm of the premises security system 11 associated with the false sensor trigger. As used herein, an "expedited alarm" may refer to an alarm which has a higher priority than a non-expedited alarm, an alarm which is transmitted from security sensor device 14 to a remote monitoring center 20 (e.g., before or instead of being transmitted to control device 15), etc.

According to one or more embodiments, modifying the state of the security sensor device 14 includes transitioning to a bypass state for a predetermined amount of time based at least in part on the user input being associated with a second input pattern (e.g., a pattern of button presses, a gesture, a spoken command, etc.). The second input pattern may be different than the first input pattern. The sensor indication is configured to cause the control device 15 to perform at least one premises security action, including displaying a user notification of the sensor trigger, or causing transmission of the user notification to a remote device (e.g., remote monitoring center 20).

According to one or more embodiments, the security sensor device is configured for attempting to perform an additional biometric authentication of the user, and transitioning to a lockdown state based at least in part on the additional biometric authentication being unsuccessfully performed, for example, if the captured biometric data does not match the reference biometric data, or if it does match the reference biometric data, but the reference biometric data is associated with a user who does not have privileges for modifying the state of the security sensor device 14. Users may be associated with corresponding reference biometric data (e.g., fingerprints of user A, fingerprints of user B, etc.) and/or with corresponding privileges (e.g., user A may modify the state of the security sensor device 14, user B may not modify the state, user C may modify some states but may not modify other states, etc.) during installation/setup/configuration of the premises security system 11, such as via control device 15 (e.g., a relay of a data packet, a transmission of another data packet based at least in part on data received from the security sensor device 14, etc.). The sensor indication is configured to cause the control device 15 to display a notification associated with the lockdown state (e.g., "Front Door Sensor Locked Down"). As used herein, a "lockdown state" may refer to a state in which the security sensor device 14 may not be further modified, e.g., may not enter a bypass state, until it exits the lockdown state. This may be advantageous, for example, in scenarios where an administrator user (e.g., who has privileges for modifying the state, e.g., to enter the lockdown state) wishes to prevent other users from placing the security sensor device 14 in a bypass state.

According to one or more embodiments, the security sensor device 14 includes a biometric sensor (e.g., the biometric hardware 25 is integrated with the user input hardware 23, such that when the user presses the button, the biometric hardware 25 is configured to capture biometric data of the user), and the biometric authentication is a fingerprint authentication. The user input includes the user pressing a button of the security sensor device 14.

According to one or more embodiments, the security sensor device 14 includes an image sensor, and the biometric authentication includes a facial recognition. The user input includes the user pressing a button (e.g., input hardware 23) of the security sensor device. Alternatively, or additionally, the user indicates a facial expression (e.g., corresponding to an input command, such as a smiling expression commanding the sensor to enter the bypass mode), which is captured by the user input hardware 23 and the biometric hardware 25 (which may share one or more hardware elements, or may be the same hardware).

According to one or more embodiments, the security sensor device 14 is further configured to receive a status request command prior to receiving the user input, where the status request command corresponds to a first button press (and/or other input via user input hardware 23, e.g., a switch, a voice command, etc.), and the user input is a second button press (and/or other input via user input hardware 23, e.g., a switch, a voice command, etc.) which occurs subsequent to the first user input. Security sensor device 14 displays a status indication associated with the state of the security sensor device based at least in part on the received status request command (which, in some embodiments, may also require biometric authentication).

According to one or more embodiments, the status indication corresponds to causing display of a color of an LED of the security sensor device 14.

According to one or more embodiments, causing display of the status indication includes causing an LED (or other status indicator hardware 26) of the security sensor device to illuminate. For example, the LED may display a first color associated with a bypass state of the security sensor device, a second color associated with an un-bypass state of the security sensor device, a third color associated with an OFF state of the security sensor device, a fourth color associated with an armed state of the security sensor device, etc.

According to one or more embodiments, the security sensor device 14 is further configured to start a timer upon receiving the status request command, where the second button press occurs prior to an expiration of the timer. In other words, if the subsequent second button press (or other input via user input hardware 24) is not received prior to the expiration of the timer, then the second button press may be interpreted by security sensor device 14 as a first button press, e.g., another status request command.

In some embodiments, the status indicator hardware 26 may be configured to indicate or display the state of the security sensor device 14 (e.g., LED color(s), an audible description of the state, a text display, etc.) based at least in part on a user input of a particular pattern corresponding to a status request command. In some embodiments, a first user input (e.g., a first button press) causes the status indicator hardware 26 to display the state, while a second user input (e.g., a second button press) causes the modification of the state, as described herein. In such embodiment, the first user input may not require an associated biometric authentication to effect the command (e.g., the status indicator hardware 26 will display the state without needing a biometric authentication), while the second user input does require a biometric authentication to effect the command (e.g., the modification of the state requires a biometric authentication to be successful). In other embodiments, both the first user input and the second user input require a biometric authentication (e.g., the status indicator hardware 26 will not display the state unless the biometric authentication is successful).

Thus, some embodiments may include user input hardware 23 and/or biometric hardware 25 (e.g., an on-board fingerprint reader integrated in a button) that the user can use to retrieve the status of the security sensor device 14 using on-board status indicator hardware 26 (e.g., LEDs), and then use the user input hardware 23/biometric hardware 25 (e.g., fingerprint reader integrated in a button) a second time to modify the state of the security sensor device 14 to a bypass/un-bypass state. This may be a two-step process, for example:

1. The user presents her finger to the on-board reader (user input hardware 23/biometric hardware 25), e.g., while the status indicator hardware 26 is OFF. The biometric authentication unit 16 authenticates the user (e.g., by comparing the captured biometric data of the fingerprint with a reference/authentic biometric data of the user's fingerprint captured during a configuration phase of the system 11, and determining that they match and that the user associated with the reference biometric data has appropriate privileges). Next, the on-board LED (status indicator hardware 26) will turn ON to show the status/state of the security sensor device 14. For example, if the security sensor device 14 is armed, then the on-board LED will be set to emit a red color, and if the sensor is disarmed or bypassed, the color with be set to green.
2. The user next performs the same authentication method (e.g., pressing her finger to the user input hardware 23/biometric hardware 25) when the LED is ON, which may reverse or otherwise modify the state of the security sensor device 14. For example, if the sensor is armed at the time the user presses the button/fingerprint sensor, this modifies the state of the security sensor device 14 to a bypass state, and the LED changes to a green color. If, instead, the sensor was previously bypassed (i.e., it is in a bypass state when the user presses the button/fingerprint sensor), this modifies the state of the security sensor device 14 to an armed state or un-bypass state, and the LED changes to a red color indicating the state.

In some embodiments, the security sensor device 14 may also notify one or more entities of premises security system 11 (e.g., a control device such as a control panel 15) of the state changes (e.g., bypass or un-bypass activity), so that premises security system 11 may properly respond to this activity and/or may log the events into an event history/log.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the following claims.

What is claimed is:

1. A method implemented by a security sensor device in a premises security system, the security sensor device being configured to communicate with a premises security control device, the method comprising:
- performing a biometric authentication of a user;
- transitioning, based at least in part on the biometric authentication, the security sensor device to a bypass state;
- detecting a sensor trigger when the security sensor device is in the bypass state;
- initiating, in response to the sensor trigger being detected when the security sensor device is in the bypass state, a user notification of the sensor trigger;
- transmitting a sensor indication to the premises security control device, the sensor indication being configured to cause the premises security control device to perform at least one premises security action;
- receiving a status request command;
- in response to receiving the status request command, initiating a status indication corresponding to the state of the security sensor device, the initiating of the status indication causing a light emitting diode (LED) of the security sensor device to illuminate;
- determining that a user input was received within a predefined time period after receiving the status request command; and wherein transitioning the security sensor device to the bypass state is further in response to the user input being received within the predefined time period.

2. The method of claim 1, wherein the sensor trigger comprises at least one of:

a door opening in proximity to the security sensor device;

a window opening in proximity to the security sensor device;

an adult moving in proximity to the security sensor device;

a child moving in proximity to the security sensor device;

an animal moving in proximity to the security sensor device; or a vehicle moving in proximity to the security sensor device.

3. The method of claim 1, further comprising:

receiving a user input;

determining that the user input corresponds to a predefined input pattern; and wherein transitioning the security sensor device to the bypass state is further in response to determining that the user input corresponds to the predefined input pattern.

4. The method of claim 1, further comprising:

receiving a user input;

determining that the user input corresponds to a predefined input pattern;

transitioning the security sensor device to an override state in response to determining that the user input corresponds to the predefined input pattern, the override state being associated with a false sensor trigger; and initiating an alarm that corresponds to the false sensor trigger.

5. The method of claim 4, wherein the alarm that corresponds to the false sensor trigger is a silent alarm.

6. The method of claim 1, further comprising:

determining that an additional biometric authentication is being attempted;

determining that the additional biometric authentication is unsuccessful; and transitioning the security sensor device to a lockdown state in response to determining that the additional biometric authentication is unsuccessful.

7. The method of claim 1, wherein the biometric authentication comprises a fingerprint authentication.

8. The method of claim 1, wherein the biometric authentication comprises a facial recognition.

9. A security sensor device in a premises security system, the security sensor device being configured to communicate with a premises security control device, the security sensor device comprising processing circuitry configured to:

perform a biometric authentication of a user;

transition, based at least in part on the biometric authentication, the security sensor device to a bypass state;

detect a sensor trigger when the security sensor device is in the bypass state;

initiate, in response to the sensor trigger being detected and when the security sensor device is in the bypass state, a user notification of the sensor trigger;

cause transmission of a sensor indication to the premises security control device, the sensor indication being configured to cause the premises security control device to perform at least one premises security action;

receive a status request command;

in response to receiving the status request command, initiate a status indication corresponding to the state of the security sensor device, the initiating of the status indication causing a light emitting diode (LED) of the security sensor device to illuminate;

determine that a user input was received within a predefined time period after receiving the status request command; and wherein transitioning the security sensor device to the bypass state is further in response to the user input being received within the predefined time period.

10. The security sensor device of claim 9, wherein the sensor trigger comprises at least one of:

a door opening in proximity to the security sensor device;

a window opening in proximity to the security sensor device;

an adult moving in proximity to the security sensor device;

a child moving in proximity to the security sensor device;

an animal moving in proximity to the security sensor device; or a vehicle moving in proximity to the security sensor device.

11. The security sensor device of claim 9, wherein the processing circuitry is further configured to:

receive a user input;

determine that the user input corresponds to a predefined input pattern; and wherein transitioning the security sensor device to the bypass state is further in response to determining that the user input corresponds to the predefined input pattern.

12. The security sensor device of claim 9, wherein the processing circuitry is further configured to:

receive a user input;

determine that the user input corresponds to a predefined input pattern;

transition the security sensor device to an override state in response to determining that the user input corresponds to the predefined input pattern, the override state being associated with a false sensor trigger; and initiate an alarm that corresponds to the false sensor trigger.

13. The security sensor device of claim 12, wherein the alarm that corresponds to the false sensor trigger is a silent alarm.

14. The security sensor device of claim 9, wherein the processing circuitry is further configured to:

determine that an additional biometric authentication is being attempted;

determine that the additional biometric authentication is unsuccessful; and transition the state of the security sensor device to a lockdown state in response to determining that the additional biometric authentication is unsuccessful.

15. The security sensor device of claim 9, wherein the biometric authentication comprises a fingerprint authentication.

16. The security sensor device of claim 9, wherein the processing circuitry is further configured to:

cause the LED to illuminate a first color when the security sensor device is associated with the bypass state;

cause the LED to illuminate a second color when the security sensor device is associated with an un-bypass state;

cause the LED to illuminate a third color when the security sensor device is associated with an off state;

cause the LED to illuminate a fourth color when the security sensor device is associated with an armed state; and the first color, the second color, the third color, and the fourth color being different from each other.

* * * * *